US011101667B2

(12) United States Patent
Shiraishi

(10) Patent No.: US 11,101,667 B2
(45) Date of Patent: Aug. 24, 2021

(54) ENERGY STORAGE APPARATUS AND CHARGE CONTROL METHOD FOR THE SAME

(71) Applicant: GS Yuasa International Ltd., Kyoto (JP)

(72) Inventor: Takeyuki Shiraishi, Kyoto (JP)

(73) Assignee: GS YUASA INTERNATIONAL LTD., Kyoto (JP)

( * ) Notice: Subject to any disclaimer, the term of this patent is extended or adjusted under 35 U.S.C. 154(b) by 0 days.

(21) Appl. No.: 15/669,682

(22) Filed: Aug. 4, 2017

(65) Prior Publication Data
US 2018/0048165 A1 Feb. 15, 2018

(30) Foreign Application Priority Data

Aug. 9, 2016 (JP) .............................. JP2016-156356

(51) Int. Cl.
*H02J 7/00* (2006.01)
*H01M 10/48* (2006.01)
(Continued)

(52) U.S. Cl.
CPC ......... *H02J 7/0016* (2013.01); *H01M 10/425* (2013.01); *H01M 10/441* (2013.01); *H01M 10/48* (2013.01); *H01M 10/482* (2013.01); *H02J 7/0026* (2013.01); *H02J 7/0029* (2013.01); *H01M 10/0525* (2013.01); *H01M 2010/4271* (2013.01); *H01M 2220/20* (2013.01); *H02J 7/007* (2013.01); *H02J 7/0031* (2013.01);
(Continued)

(58) Field of Classification Search
CPC ....... H02J 2007/0098; H01M 10/4257; H01M 2010/4271; H01M 2010/4278; H01M 2200/00; G01R 31/3624; G01R 31/362

USPC ................................ 320/107, 162, 134, 136
See application file for complete search history.

(56) References Cited

U.S. PATENT DOCUMENTS

| 4,649,282 A | * | 3/1987 | Ota ....................... G08B 17/107 250/574 |
| 5,581,170 A | * | 12/1996 | Mammano ............ H02J 7/0019 320/116 |

(Continued)

FOREIGN PATENT DOCUMENTS

| JP | 2000-067929 A | 3/2000 |
| JP | 2005-124275 A | 5/2005 |

(Continued)

OTHER PUBLICATIONS

Extended European Search Report dated Dec. 6, 2017 in corresponding European Application No. 17184667.8-1804.

*Primary Examiner* — Drew A Dunn
*Assistant Examiner* — Tarikh Kanem Rankine
(74) *Attorney, Agent, or Firm* — McGinn I. P. Law Group, PLLC.

(57) ABSTRACT

An energy storage apparatus includes: an energy storage device; a voltage dropper configured to drop a charge voltage for the energy storage device; a current switcher connected in parallel with the voltage dropper; a voltage detection unit configured to detect a voltage of the energy storage device; and a controller. When the voltage of the energy storage device exceeds a predetermined value, the controller causes the current switcher to switch a path of a charge current to the energy storage device to a path through the voltage dropper.

14 Claims, 9 Drawing Sheets

(51) Int. Cl.
*H01M 10/42* (2006.01)
*H01M 10/44* (2006.01)
*H01M 10/0525* (2010.01)

(52) U.S. Cl.
CPC ....... *H02J 7/00302* (2020.01); *H02J 7/00306* (2020.01)

(56) References Cited

U.S. PATENT DOCUMENTS

| | | | |
|---|---|---|---|
| 5,907,232 A * | 5/1999 | Wakefield | H02J 7/0011 320/130 |
| 6,007,937 A * | 12/1999 | Ruiz Rodriguez | B60L 50/64 429/94 |
| 6,094,034 A * | 7/2000 | Matsuura | H02J 7/0093 320/134 |
| 6,229,279 B1 * | 5/2001 | Dierker | F02N 11/0866 320/104 |
| 6,639,387 B2 * | 10/2003 | Kitagawa | G01R 19/16542 320/134 |
| 7,298,113 B2 * | 11/2007 | Orikasa | H01M 6/5033 320/103 |
| 7,391,184 B2 * | 6/2008 | Luo | H01M 10/441 307/48 |
| 7,737,658 B2 * | 6/2010 | Sennami | H01M 2/1022 320/111 |
| 8,093,865 B2 * | 1/2012 | Nishikawa | H02J 7/045 320/134 |
| 8,253,383 B2 * | 8/2012 | Li | G01R 31/396 320/134 |
| 8,796,996 B2 * | 8/2014 | Nakatsuji | H01M 2/34 320/134 |
| 8,896,315 B1 * | 11/2014 | Davies | H02J 7/0019 324/434 |
| 9,537,330 B2 * | 1/2017 | Crane | H02J 7/0068 |
| 9,590,619 B2 * | 3/2017 | Kittila | H03K 17/0812 |
| 10,199,831 B2 * | 2/2019 | Hopf | H02J 3/383 |
| 2001/0011883 A1 * | 8/2001 | Sonobe | H02J 7/0047 320/134 |
| 2002/0057936 A1 * | 5/2002 | Shirotori | B41J 2/30 400/118.3 |
| 2005/0212489 A1 * | 9/2005 | Denning | H02J 7/0031 320/134 |
| 2007/0075684 A1 * | 4/2007 | Liu | H02J 7/0031 320/128 |
| 2007/0080661 A1 | 4/2007 | Nakashima et al. | |
| 2007/0129768 A1 * | 6/2007 | He | A61N 1/08 607/34 |
| 2007/0247107 A1 * | 10/2007 | Wang | H02J 7/0073 320/107 |
| 2008/0278116 A1 * | 11/2008 | Matsunaga | H01M 10/44 320/134 |
| 2009/0085515 A1 * | 4/2009 | Bourilkov | H02J 7/0024 320/117 |
| 2009/0128159 A1 * | 5/2009 | Nakatsuji | G01R 31/52 324/433 |
| 2009/0309547 A1 * | 12/2009 | Nakatsuji | H02J 7/06 320/134 |
| 2010/0304206 A1 * | 12/2010 | Nakashima | H01M 10/30 429/156 |
| 2011/0001352 A1 | 1/2011 | Tamura et al. | |
| 2011/0037438 A1 * | 2/2011 | Bhardwaj | H02J 7/0071 320/152 |
| 2011/0193525 A1 * | 8/2011 | Ro | H02J 7/0016 320/116 |
| 2011/0316344 A1 * | 12/2011 | Van Lammeren | H01M 10/42 307/77 |
| 2012/0228943 A1 * | 9/2012 | Nakashima | H02J 1/108 307/66 |
| 2012/0235491 A1 * | 9/2012 | Nakashima | H02J 7/35 307/66 |
| 2012/0315550 A1 * | 12/2012 | Liu | H01M 4/587 429/338 |
| 2013/0147433 A1 * | 6/2013 | Chen | H02J 7/0013 320/112 |
| 2013/0249529 A1 * | 9/2013 | Seok | G05F 1/46 323/364 |
| 2014/0091767 A1 | 4/2014 | Tamura et al. | |
| 2015/0145482 A1 | 5/2015 | Hurng et al. | |
| 2015/0244192 A1 * | 8/2015 | Dauchy | H02J 7/0086 320/152 |
| 2016/0073212 A1 * | 3/2016 | Zeleznik | H01L 23/49541 324/548 |
| 2016/0105173 A1 * | 4/2016 | De Rooij | H03K 19/017509 327/109 |
| 2016/0261121 A1 * | 9/2016 | Baek | H02J 7/00 |
| 2016/0359483 A1 * | 12/2016 | Mukhopadhyay | H03K 17/74 |
| 2018/0331005 A1 * | 11/2018 | Fukuchi | H01L 24/05 |

FOREIGN PATENT DOCUMENTS

| | | |
|---|---|---|
| JP | 2006-121900 A | 5/2006 |
| JP | 2007-109465 A | 4/2007 |
| JP | 2008-199717 A | 8/2008 |
| JP | 2010-200485 A | 9/2010 |
| JP | 2011-078147 A | 4/2011 |
| JP | 2011-101517 A | 5/2011 |
| JP | 2011-182479 A | 9/2011 |
| JP | 2013-243823 A | 12/2013 |
| JP | 2014-039400 A | 2/2014 |
| JP | 2014-225942 A | 12/2014 |
| JP | 2015-103514 A | 6/2015 |

* cited by examiner

ENERGY STORAGE APPARATUS AND CHARGE CONTROL METHOD FOR THE SAME

CROSS-REFERENCE TO RELATED APPLICATIONS

This application is based on Japanese Patent Application No. 2016-156356 filed on Aug. 9, 2016, the entire contents of which are hereby incorporated by reference.

FIELD

The technique disclosed herein relates to an energy storage apparatus and a charge control method for an energy storage apparatus.

BACKGROUND

JP 2014-225942 discloses an energy storage system for starting an engine of a vehicle. Instead of a lead-acid battery, this energy storage system adopts a secondary battery that can be made smaller and lighter than a lead-acid battery, such as a lithium ion battery.

In this type of energy storage systems, due to the difference in battery characteristics, the charge voltage of the lead-acid battery is set to, for example, 14.8 [V] while the charge voltage of the lithium ion battery is set to, for example, 14 [V]. The charge voltage of the lithium ion battery is set lower than that of the lead-acid battery.

Since the shape of a body of the energy storage system and the shape of a communication connector are made to have the same shape as those of the lead-acid battery, the lithium ion battery may be charged by a charger for lead-acid batteries. If charged by a constant-current constant-voltage charge type charger for lead-acid batteries, the lithium ion battery is kept charged even after the battery voltage exceeds an allowable charge range, resulting in an overcharge state.

SUMMARY

The following presents a simplified summary of the invention disclosed herein in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

A technique disclosed herein allows charging to be continued without causing a problem even when the charge is performed with a charge voltage higher than an assumed charge voltage.

The technique disclosed herein has a configuration including: an energy storage device, a voltage dropper configured to drop a charge voltage for the energy storage device, a current switcher connected in parallel with the voltage dropper and configured to switch a path of a charge current to the energy storage device to a path through the voltage dropper, a voltage detection unit configured to detect a voltage of the energy storage device, and a controller. When the voltage of the energy storage device exceeds a predetermined value, the controller switches the path of the charge current to the path through the voltage dropper, using the current switcher.

BRIEF DESCRIPTION OF DRAWINGS

The foregoing and other features of the present invention will become apparent from the following description and drawings of an illustrative embodiment of the invention in which.

DESCRIPTION OF EMBODIMENTS

Summary of Present Embodiment

Figure 1:
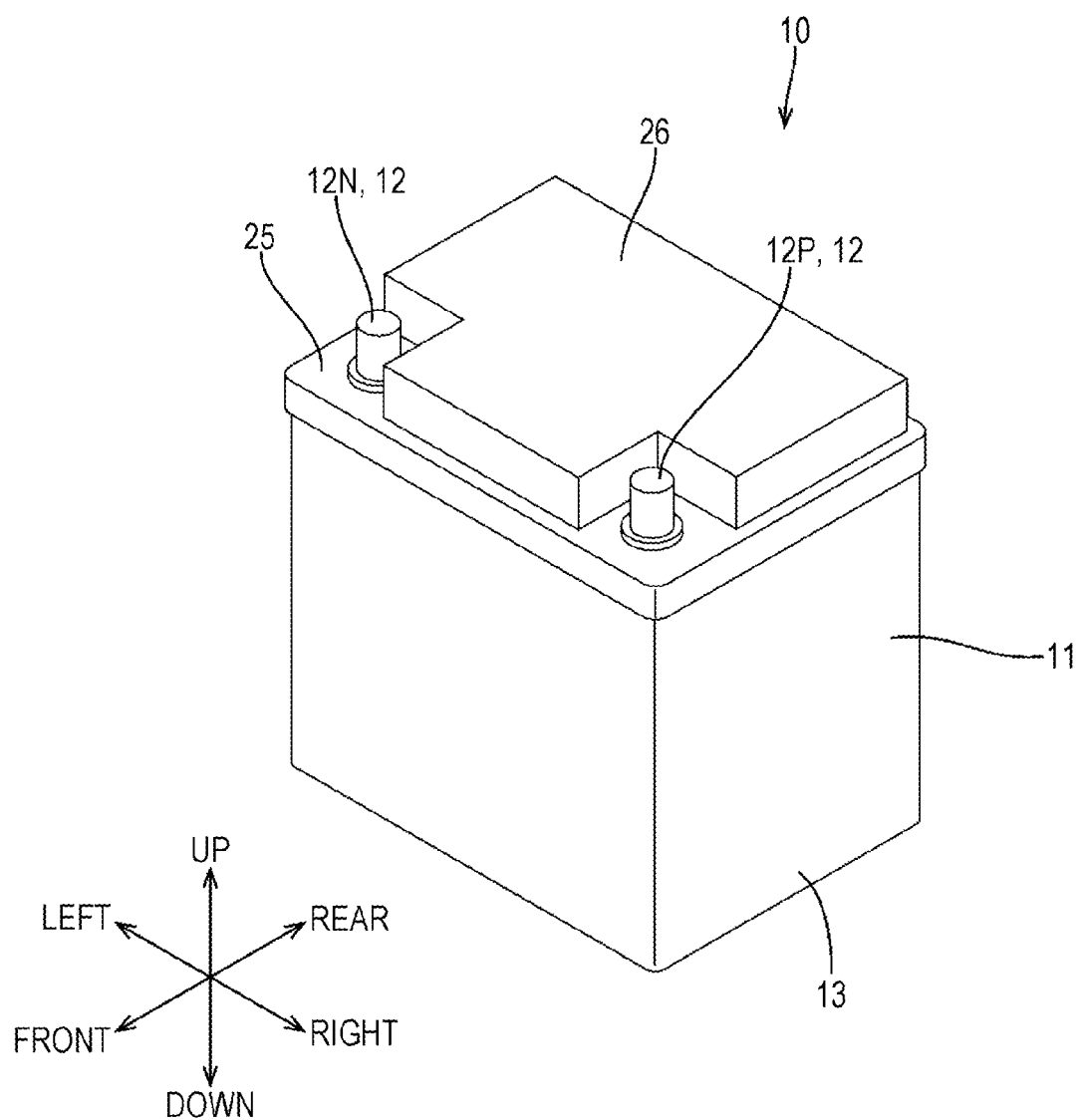
FIG. 1 is a perspective view of an energy storage apparatus in a first embodiment.

First, a summary of an energy storage apparatus and a charge control method for the energy storage apparatus disclosed herein will be described.

The energy storage apparatus disclosed herein includes: an energy storage device, a voltage dropper configured to drop a charge voltage for the energy storage device, a current switcher connected in parallel with the voltage dropper, a voltage detection unit configured to detect a voltage of the energy storage device, and a controller. When a voltage of the energy storage device exceeds a predetermined value, the controller causes the current switcher to switch a path of the charge current to the energy storage device to a path through the voltage dropper.

In addition, the energy storage apparatus disclosed herein is capable of being charged with any one of a first charger and a second charger having a charge voltage higher than that of the first charger. The energy storage apparatus includes: an energy storage device, a voltage dropper configured to drop a charge voltage for the energy storage device, a current switcher connected in parallel with the voltage dropper, a voltage detection unit configured to detect a voltage of the energy storage device, and a controller. When the energy storage device is charged by the second charger, and the voltage of the energy storage device exceeds a predetermined value, the controller causes the current switcher to switch a path of the charge current to the energy storage device to a path through the voltage dropper.

In addition, the charge control method for the energy storage apparatus disclosed herein is for an energy storage apparatus capable of being charged with any one of a first charger and a second charger having a charge voltage higher than that of the first charger. The charge control method for an energy storage apparatus includes lowering a charge voltage to lower a charge current when an energy storage device is charged with the second charger and a voltage of the energy storage device exceeds a full charge voltage.

It should be noted that in the above, when there is a plurality of energy storage devices, the voltage of the energy storage device may mean the voltage of each energy storage device and also may mean the total voltage of the plurality of energy storage devices.

According to the above configuration, when the energy storage apparatus is charged by a charge voltage higher than the predetermined value and the voltage of the energy storage device exceeds the predetermined value, the path of the charge current is switched to the path through the voltage dropper, using the current switcher. Then, charging through the voltage dropper allows the charge voltage for the energy storage device to be lowered to prevent the voltage of the energy storage device from rising. Thus, for example, even when the energy storage apparatus is charged by a charger having a charge voltage higher than the predetermined value, the energy storage device can be prevented from becoming the overcharge state and the charge can be continued without causing a problem.

The predetermined value may be set to be higher than a full charge voltage of the energy storage device and lower than an overcharge voltage of the energy storage device. When the energy storage device is charged with a voltage higher than the full charge voltage of the energy storage device, and the voltage of the energy storage device exceeds the predetermined value, the controller may cause the current switcher to switch the path of the charge current to the energy storage device to the path through the voltage dropper.

According to this configuration, when the energy storage device is charged by a charge voltage higher than the full charge voltage and the voltage of the energy storage device exceeds the predetermined value, the path of the charge current is switched to the path through the voltage dropper, using the current switcher. The charge voltage is dropped with the voltage dropper. Thus, when the charge is performed with a voltage higher than the full charge voltage value of the energy storage device, a plurality of energy storage devices can be prevented from becoming the overcharge state.

In addition, the predetermined value may be determined by subtracting, from the charge voltage of the second charger, a voltage drop amount by which the voltage dropper drops a voltage.

In addition, a plurality of the energy storage devices may be connected in series, the voltage detection unit may be capable of detecting each voltage of the energy storage devices, and the controller may perform equalization (balancing) processing for equalizing variation in charge amount among the energy storage devices when switching the path of the charge current to the path through the voltage dropper.

Since the battery voltage may sharply rise near the full charge depending on the type of the lithium ion battery, there is a risk that the equalization processing cannot be done in time even if the equalization processing for equalizing variation in charge amount among batteries is performed. Therefore, the battery voltage exceeds the threshold value, which causes a current shutoff device in the energy storage system to shut off the current.

According to the above configuration, charging through a voltage drop element to lower the charge voltage of the energy storage device reduces the charge current. This allows the time for equalization processing for equalizing variation in charge amount among energy storage devices to be secured, and the voltage of the energy storage device to be prevented from exceeding the threshold value.

In addition, the current switcher may be a semiconductor switch incorporating the voltage dropper as a parasitic diode.

According to this configuration, since a parasitic diode of the semiconductor switch can be used as the voltage dropper, the number of components can be reduced and the circuit can be simplified, as compared with a case where, for example, a contact relay (mechanical switch) is provided as the current switcher and a diode being the voltage dropper is provided in parallel with the contact relay, The energy storage apparatus may further include a current detection unit configured to detect a current flowing through the energy storage device, and may further include an auxiliary current breaker configured to shut off a charge current to the energy storage device, and the controller may completely shut off the charge current to the energy storage device with the auxiliary current breaker when the charge current to the energy storage device is lower than a current stop value set in a charger.

According to this configuration, if the charge is continued despite the charge current being lower than the current stop value set in the charger, it is assumed that the charge is completed and a fault occurs in the charger. Then, the charge current to the energy storage device is completely shut off and the charge to the energy storage apparatus can be completed.

Embodiment

An embodiment, in which the technique disclosed herein is applied to an energy storage apparatus 10 for starting an engine of a vehicle such as a car, will be described with reference to FIGS. 1 to 9.

As shown in FIG. 1, the energy storage apparatus 10 includes a block-shaped battery case 11. Inside the battery case 11, as shown in FIG. 2, an assembled battery 20 formed by connecting a plurality (four in the present embodiment) of energy storage devices 21 in series, a control board 18, and the like are housed.

Figure 2:
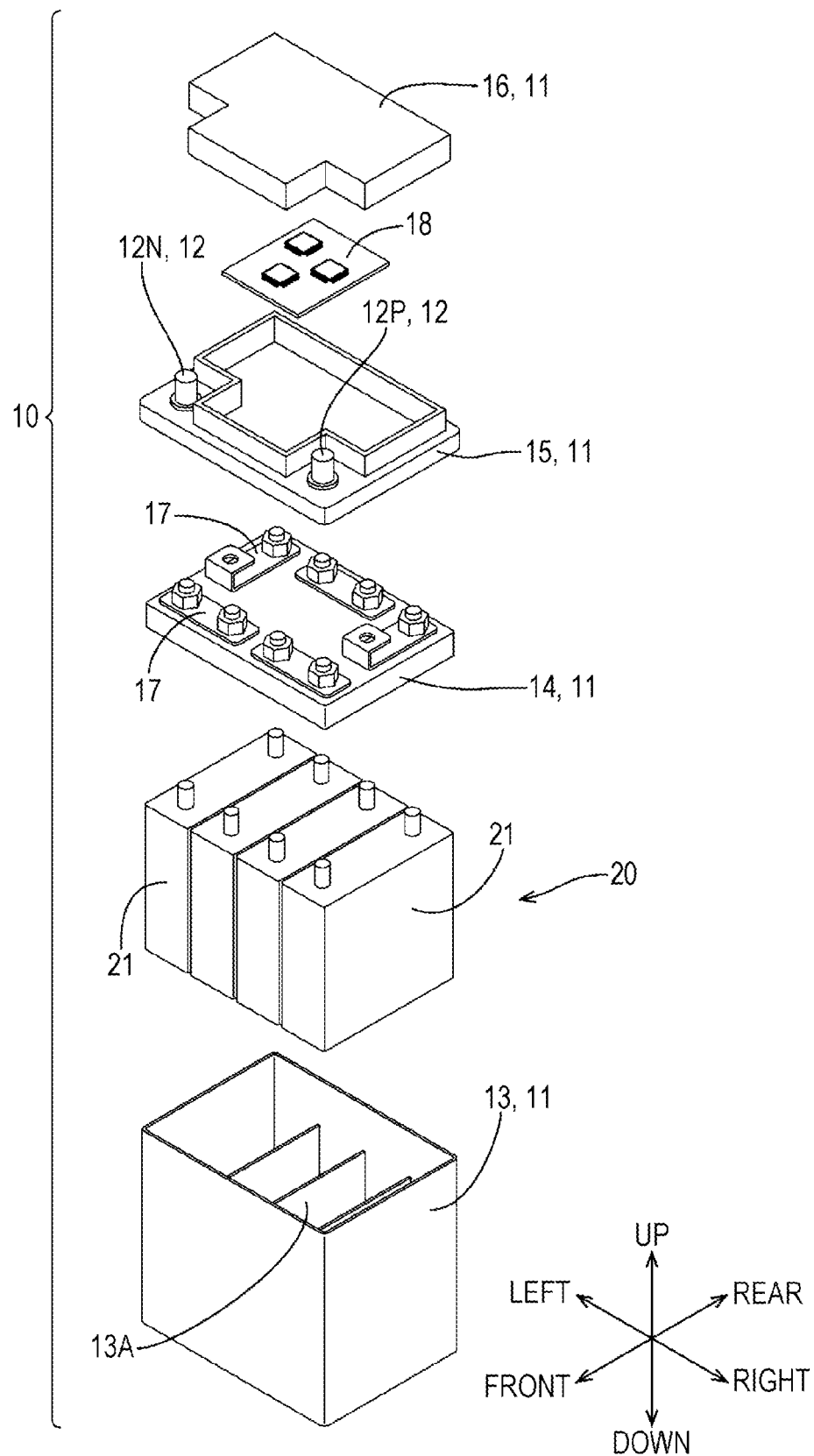
FIG. 2 is an exploded perspective view of the energy storage apparatus.

It should be noted that in the following description, when FIGS. 1 and 2 are referred to, the vertical direction is based on the vertical direction of the battery case 11 when the battery case 11 is placed horizontally without inclination with respect to the installation surface. The front-rear direction is based on the direction along the short side portion of the battery case 11 (depth direction), and the left front side shown in the figures is set as the front side. In addition, the left-right direction is based on the direction along the long side portion of the battery case 11, and the right front side shown in the figures is set as the right direction.

The battery case 11 is made of synthetic resin, and as shown in FIG. 2, includes a box-shaped case body 13 opening upward, a positioning member 14 for positioning a plurality of energy storage devices 21, an inner lid 15 mounted on the upper portion of the case body 13, and an upper lid 16 mounted on the upper portion of the inner lid 15.

In the case body 13, a plurality of cell chambers 13A in which respective pieces of the plurality of energy storage devices 21 are individually accommodated are provided side by side in the left-right direction.

The energy storage device 21 may be a lithium ion battery using a negative active material of, for example, a graphite-based material and an iron phosphate-based positive active material such as lithium iron phosphate. The energy storage device 21 in the full charge state may have, for example, about 3.5 [V] to 3.6 [V]. The energy storage device 21 in the present embodiment has 3.5 [V] in the full charge state.

In the positioning member 14, as shown in FIG. 2, a plurality of bus bars 17 is arranged on the upper face.

Disposing the positioning member 14 on top of the four energy storage devices 21 accommodated in the case body 13 causes the four energy storage devices 21 to be positioned and to be connected in series with the plurality of bus bars 17 to thereby construct the assembled battery 20.

The assembled battery 20 is configured to have about 14 [V] during the full charge state.

As shown in FIGS. 1 and 2, the inner lid 15 has an approximately rectangular shape in a plan view, and has a shape with a height difference in the left-right direction. At both ends of the inner lid 15 in the left-right direction, a pair of external terminal units 12 is provided, to which battery terminals (not shown) in a vehicle charger or in an external charger CH using the commercial power source (e.g., 100 V) are connected. The pair of external terminal units 12 is provided in a state of being embedded in the inner lid 15. The pair of external terminal units 12 is made of a metal such as a lead alloy, for example. The right side one may be a positive electrode terminal unit 12P, and the left side one may be a negative electrode terminal unit 12N. It should be noted that the external charger CH is an example of a charger (see FIG. 3).

In addition, as shown in FIG. 2, the inner lid 15 can accommodate the control board 18 therein, and when the inner lid 15 is mounted on the case body 13, the assembled battery 20 and the control board 18 are connected to each other.

The shape of the energy storage apparatus 10 may be the same as that of a conventional lead-acid battery.

Next, the electrical configuration of the energy storage apparatus 10 will be described.

Figure 3:
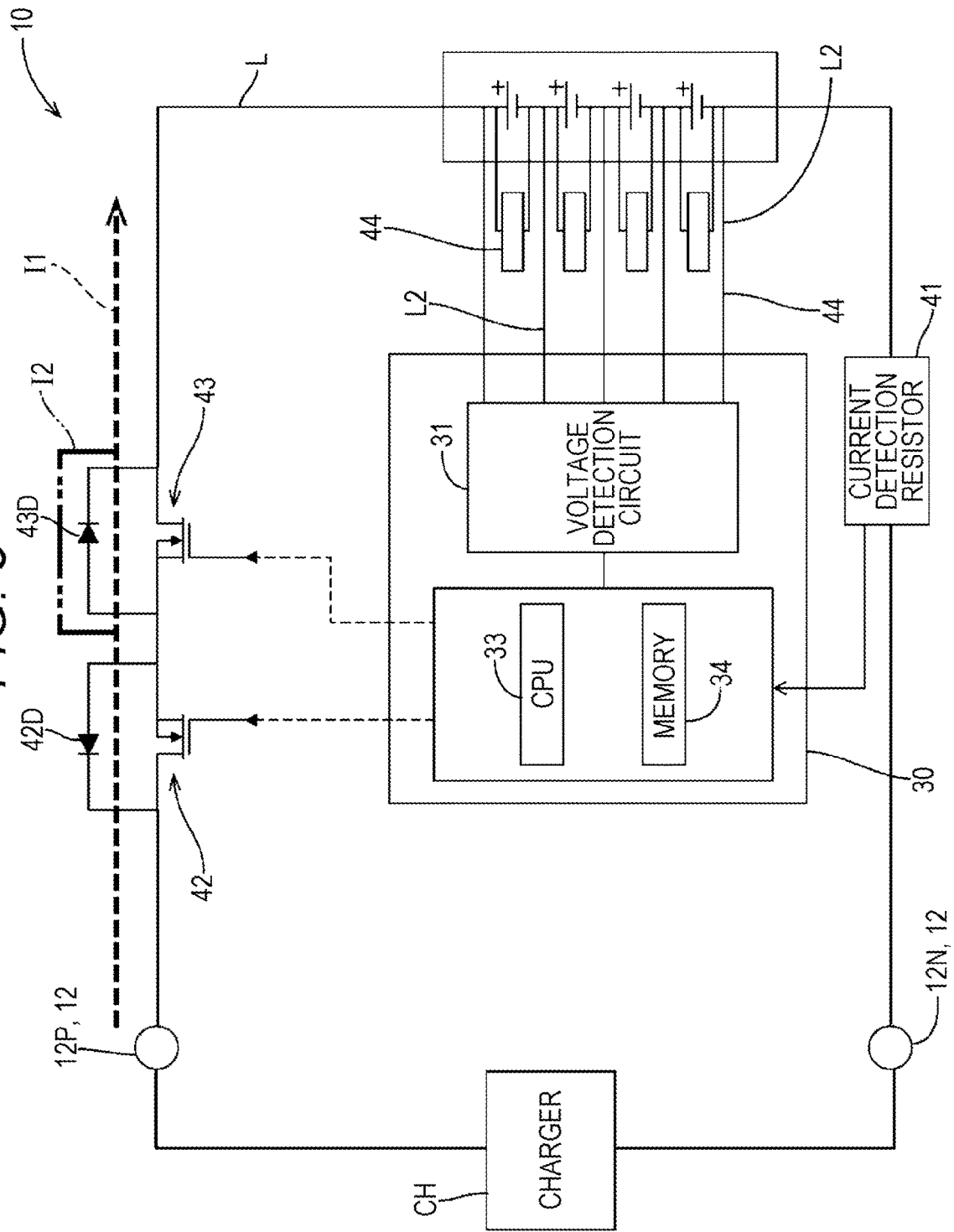
FIG. 3 is a block diagram showing an electrical configuration of the energy storage apparatus.

As shown in FIG. 3, the energy storage apparatus 10 includes the assembled battery 20, a battery management unit (hereinafter referred to as "BMU") (an example of "controller") 30, a current detection resistor 41, a charge shutoff device 42, a discharge shutoff device 43, and a discharge circuit 44. It should be noted that the discharge shutoff device 43 is an example of "semiconductor switch" and "current switcher".

The assembled battery 20, the current detection resistor 41, the charge shutoff device 42, and the discharge shutoff device 43 are connected in series through a current path L. The positive electrode side of the assembled battery 20 is connected to the positive electrode terminal unit 12P through the charge shutoff device 42 and the discharge shutoff device 43, and the negative electrode side is connected to the negative electrode terminal unit 12N through the current detection resistor 41.

The current detection resistor 41 is a resistor for detecting the current flowing through the assembled battery 20. The voltage across the current detection resistor 41 is taken into the BMU 30, whereby the current flowing through the assembled battery 20 is detected.

The charge shutoff device 42 and the discharge shutoff device 43 are semiconductor switches such as N-channel FETs, each having a parasitic diode (an example of "voltage dropper") 42D or 43D. As shown in FIG. 3, when the charge shutoff device 42 or the discharge shutoff device 43 is energized through an energizing path 12 via the parasitic diodes 42D or 43D, a voltage drop of about, for example, 0.6 V occurs. The charge shutoff device 42 and the discharge shutoff device 43 have their drains commonly connected to each other, the source of the charge shutoff device 42 is connected to the positive electrode terminal unit 12P, and the source of the discharge shutoff device 43 is connected to the assembled battery 20.

Figure 4:
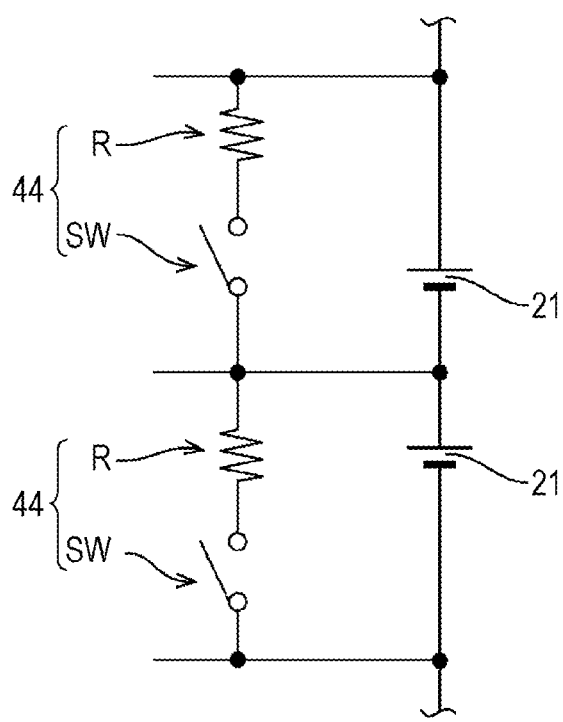
FIG. 4 is a block diagram of a discharge circuit.

As shown in FIG. 4, the discharge circuit 44 includes a discharge resistor R and a discharge switch SW, and is connected in parallel to each energy storage device 21. Giving instructions from the CPU 33 to the discharge switch SW to turn on the discharge switch SW allows the energy storage device 21 to be individually discharged. Thus, the equalization processing for reducing the difference in charge amount among the energy storage devices 21 can be performed.

The BMU 30 includes a voltage detection circuit (an example of "voltage detection unit") 31, a CPU 33 being a central processing unit (an example of "controller"), and a memory 34, which are mounted on the control board 18. The BMU 30 is supplied with electric power from the assembled battery 20 by being connected to the current path L.

The voltage detection circuit 31 is connected to both ends of each energy storage device 21 through voltage detection lines L2, and measures the cell voltage V1 of each energy storage device 21 and the battery voltage of the assembled battery 20 (total voltage of the plurality of energy storage devices 21) V2 in response to instructions from the CPU 33.

The memory 34 includes a nonvolatile memory such as a flash memory or an EEPROM, for example. The memory 34 stores various kinds of programs for managing each energy storage device 21 or the assembled battery 20, and data necessary for executing various kinds of programs, such as an overdischarge detection threshold or an overcharge detection threshold of the energy storage device 21 and the assembled battery 20, as well as a discharge amount per unit time capable of being discharged with the discharge resistor R of the discharge circuit 44.

The CPU 33 monitors the current, voltage, and the like of the energy storage device 21 from the output of the current detection resistor 41, the voltage detection circuit 31, and the like. When abnormality is detected, performing the overcharge protection processing and the overdischarge protection processing for operating the charge shutoff device 42 and the discharge shutoff device 43 prevents the assembled battery 20 from malfunctioning.

Although the charge amounts of the energy storage devices 21 in the assembled battery 20 are initially almost equal to each other, the charge amount of each energy storage device 21 decreases due to self-discharge. Consequently, variation occurs in charge amount among the energy storage devices 21. In addition, as shown in FIG. 5, in the energy storage device 21 made of iron phosphate-based lithium ions, the cell voltage (OCV: open circuit voltage) V1 tends to sharply rise with respect to the increase in SOC at the end of charge where the SOC is 90% or more.

Figure 5:
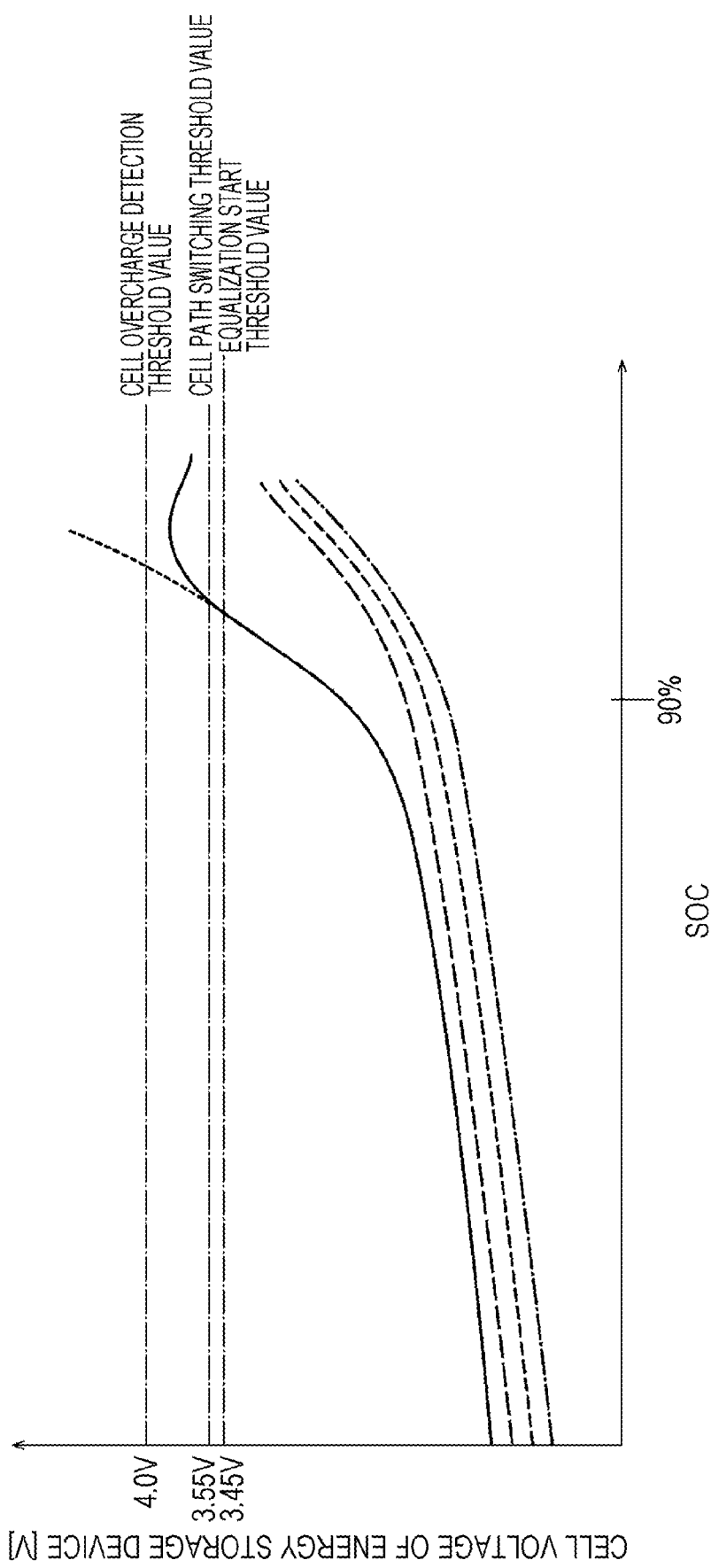
FIG. 5 is a graph showing the relationship between an SOC and a cell voltage of an energy storage device.

Therefore, when the charge of the assembled battery 20 is continued while the charge amount varies among the energy storage devices 21 of the assembled battery 20, as shown in FIG. 5, the energy storage device 21 having a relatively large charge amount becomes overcharge state at the end of the charge, and the energy storage device 21 deteriorates. Therefore, when the charge amount varies among the energy storage devices 21 of the assembled battery 20, the equalization processing for equalizing the charge amount among the energy storage devices 21 is performed in the overcharge protection processing.

Figure 6:
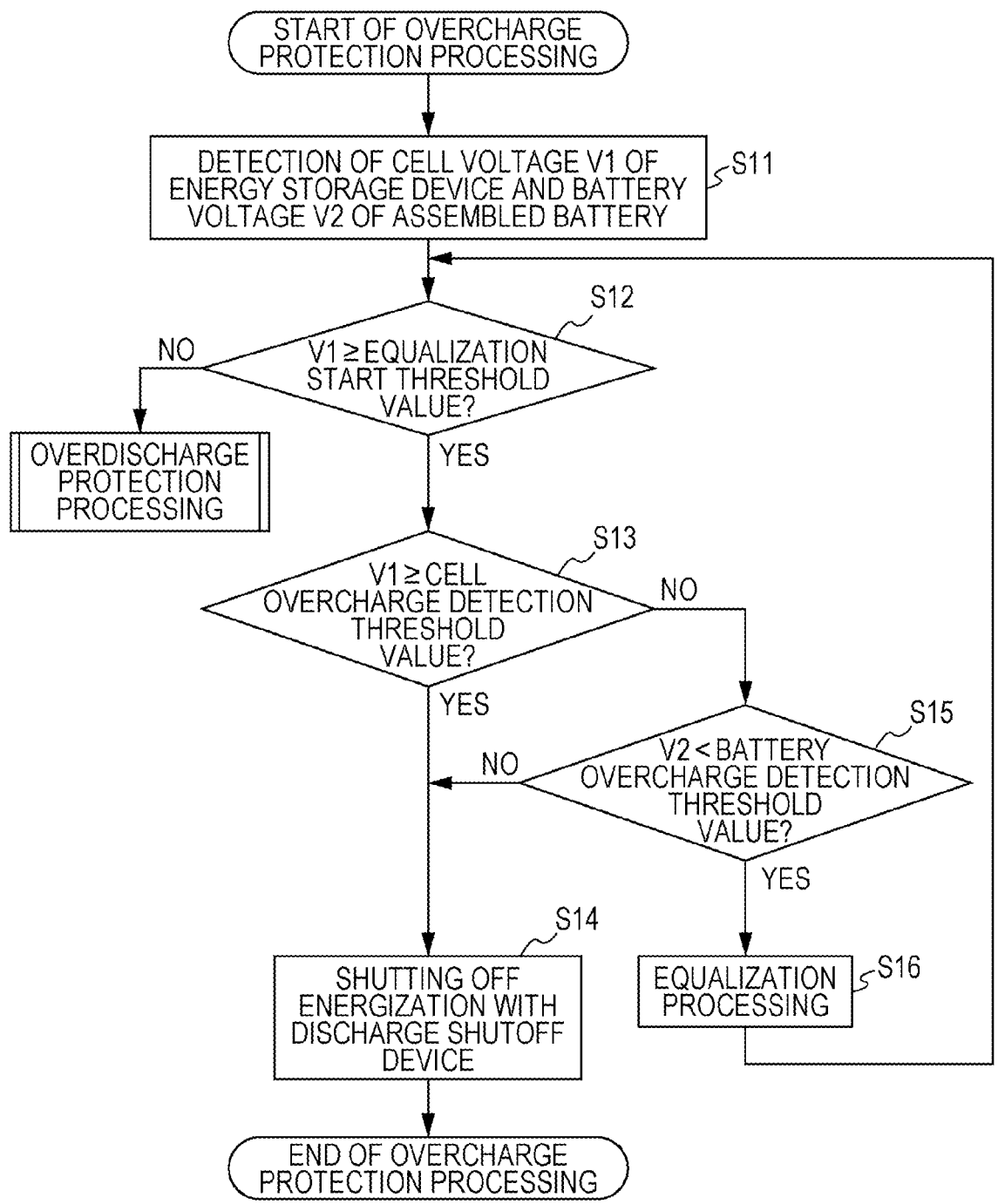
FIG. 6 is a flowchart diagram of overcharge protection processing.

In the following, the overcharge protection processing will be described with reference to FIG. 6, and the equalization processing will be described subsequently.

In a battery protection processing, the CPU 33 first causes the voltage detection circuit 31 to detect the cell voltage V1 of each energy storage device 21 and the battery voltage V2 of the assembled battery 20 (S11).

Next, the CPU 33 compares the cell voltage V1 with the equalization start threshold value stored in the memory 34 (S12). I If all of the cell voltages V1 are less than the equalization start threshold value (NO in S12), the CPU 33 performs the overdischarge protection processing described later.

On the other hand, if at least one of the cell voltages V1 is equal to or more than the equalization start threshold value (YES in S12), the CPU 33 compares the cell voltage V1 equal to or more than the equalization start threshold value with the cell overcharge detection threshold value stored in the memory 34 (S13). If the cell voltage V1 is equal to or more than the cell overcharge detection threshold value (YES in S13), since the energy storage device 21 may reach the overcharge state, the CPU 33 transmits a shutoff switching instruction for shutting off the current through the charge shutoff device 42. Thus, in the charge shutoff device 42, the energization between the assembled battery 20 and the positive electrode terminal unit 12P is shut off, and the energy storage device 21 is prevented from reaching the overcharge state (S14).

On the other hand, if the cell voltage V1 is less than the cell overcharge detection threshold value (NO in S13), the CPU 33 compares the battery voltage V2 with the battery overcharge detection threshold value stored in the memory 34 (S15). If the battery voltage V2 is less than the battery overcharge detection threshold value (YES in S15), the CPU 33 decides that the charge amount of the energy storage device 21 whose cell voltage V1 is equal to or more than the equalization start threshold value is relatively large as compared to the charge amount of the other energy storage device 21 to perform the equalization processing (S16) described later. Then, when the charge amount between each energy storage device 21 becomes approximately equal, the process returns to S12.

On the other hand, if at least one of the cell voltages V1 is equal to or more than the equalization start threshold value and the battery voltage V2 is equal to or more than the battery overcharge detection threshold value (NO in S15), since the assembled battery 20 may reach the overcharge state, the CPU 33 transmits a shutoff switching instruction for shutting off the current through the charge shutoff device 42. Thus, in the charge shutoff device 42, the energization between the external terminal unit 12 and the assembled battery 20 is shut off, and the assembled battery 20 is prevented from reaching the overcharge state (S14).

It should be noted that the cell overcharge detection threshold value is a reference voltage value for detecting the energy storage device 21 reaching the overcharge state, and is set to, for example, 4.0 [V]. The equalization start threshold value is a reference voltage value for starting the equalization processing, is lower than the full charge voltage of the energy storage device 21, and is set to, for example, 3.45 [V]. In addition, the battery overcharge detection threshold value is a reference voltage value for detecting the energy storage device 21 reaching the overcharge state, and is set to, for example, 14.5 [V].

Next, the equalization processing will be described.

In the equalization processing, the CPU 33 operates the discharge circuit 44 to cause the discharge circuit 44 to discharge the energy storage device 21 decided to have the cell voltage V1 equal to or more than the equalization start threshold value to reduce the difference in the charge amount among the energy storage devices 21. Thus, the charge amount among the energy storage devices 21 are equalized (S16).

Specifically, based on the difference in the charge amount among the energy storage devices 21 and the discharge amount per unit time of the discharge resistor R stored in the memory 34 in advance, the CPU 33 calculates the discharge time of the energy storage device 21. Then, turning on the discharge switch SW corresponding to the energy storage device 21 with the cell voltage V1 equal to or more than the equalization start threshold value for only the discharge time and discharging the energy storage device 21 equalizes the charge amount among the energy storage devices 21.

Figure 7:
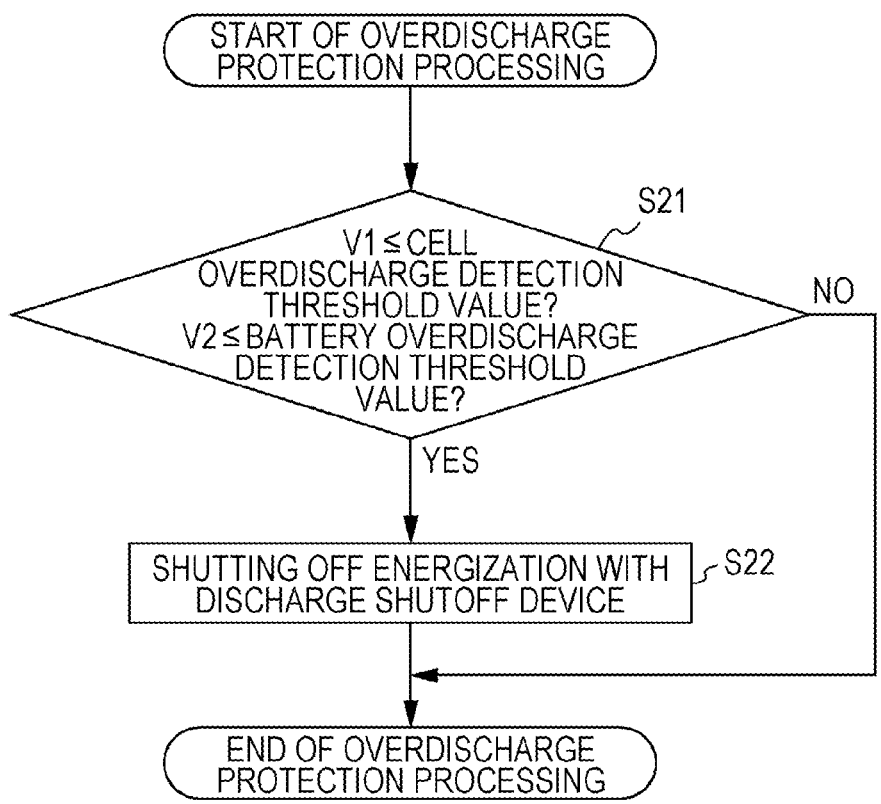
FIG. 7 is a flowchart diagram of overdischarge protection processing.

Next, the overdischarge protection processing will be described with reference to FIG. 7.

In the overdischarge protection processing, first, the CPU 33 compares the cell voltage V1 and the battery voltage V2 respectively with the cell overdischarge detection threshold value and the battery overdischarge detection threshold value stored in the memory 34 (S21).

It should be noted that the cell overdischarge detection threshold value is a value slightly larger than the voltage value when one of the energy storage devices 21 is in the overdischarge state, and the battery overdischarge detection threshold value is a value slightly larger than the voltage value when the assembled battery 20 is in the overdischarge state.

Then, if at least one of the cell voltages V1 is equal to or less than the cell overdischarge detection threshold value or if the battery voltage V2 is equal to or less than the battery overdischarge detection threshold value (YES in S21), since any one of the assembled battery 20 and the energy storage device 21 may reach the overdischarge state, the CPU 33 transmits a shutoff switching instruction to the discharge shutoff device 43. Thus, in the discharge shutoff device 43, the energization between the assembled battery 20 and the positive electrode terminal unit 12P is shut off, and the assembled battery 20 is prevented from reaching the overdischarge state (S22).

On the other hand, if all of the cell voltages V1 are larger than the cell overdischarge detection threshold value and the battery voltage V2 is larger than the battery overdischarge detection threshold value (NO in S21), the CPU 33 ends the overdischarge protection processing.

Then, repeating the overcharge protection processing and the overdischarge protection processing at all times or periodically prevents the assembled battery 20 from becoming the overcharge state or the overdischarge state.

The energy storage apparatus 10 of the present embodiment, which has the same shape as the conventional lead-acid battery, can of course be charged by the constant-current constant-voltage type external charger for lithium ion batteries (an example of the "first charger"), and may be charged, by mistake, by the constant-current constant-voltage type external charger for 12 V or 24 V for lead-acid batteries (an example of the "second charger"). In general, the charge voltage of the external charger for lithium-ion batteries is 14 [V], whereas the charge voltage of the external charger for lead-acid batteries is 14.8 [V]. Therefore, if the constant-current constant-voltage charge is performed by the external charger for lead-acid batteries by mistake, the cell voltage V1 abruptly rises at the end of the charge where the SOC of the energy storage device 21 is 90% or more. Therefore, there is a concern that even if the equalization processing is performed, the equalization processing cannot be performed in time. Therefore, the cell voltage V1 of the energy storage device 21 exceeds the cell overcharge detection threshold value, which causes the charge shutoff device 42 to shut off the current path L.

For example, when the equalization start threshold value is 3.45 [V], the cell overcharge detection threshold value is 4 [V], and the voltage at which the charger for lead-acid batteries switches from the constant-current charge to the constant-voltage charge is 14.8 [V], the charge voltage for each energy storage device 21 is 3.7 [V]. This can be obtained by converting the charge voltage of 14.8 [V] into the charge voltage per energy storage device 21.

Therefore, if there is variation among the energy storage devices 21, the cell voltage V1 of the energy storage device 21 having a large charge amount at the end of the charge of the SOC in the energy storage device 21 sharply rises. Then, there is a concern that even if the equalization processing is performed, the equalization processing cannot be performed in time. Therefore, the cell voltage V1 of the energy storage device 21 exceeds the cell overcharge detection threshold value of 4 [V], which causes the charge shutoff device 42 to shut off the current path L. In addition, even if there is no variation among the energy storage devices 21, the battery voltage V2 of the assembled battery 20 may exceed the battery overcharge detection threshold value of 14.5 [V].

Figure 8:
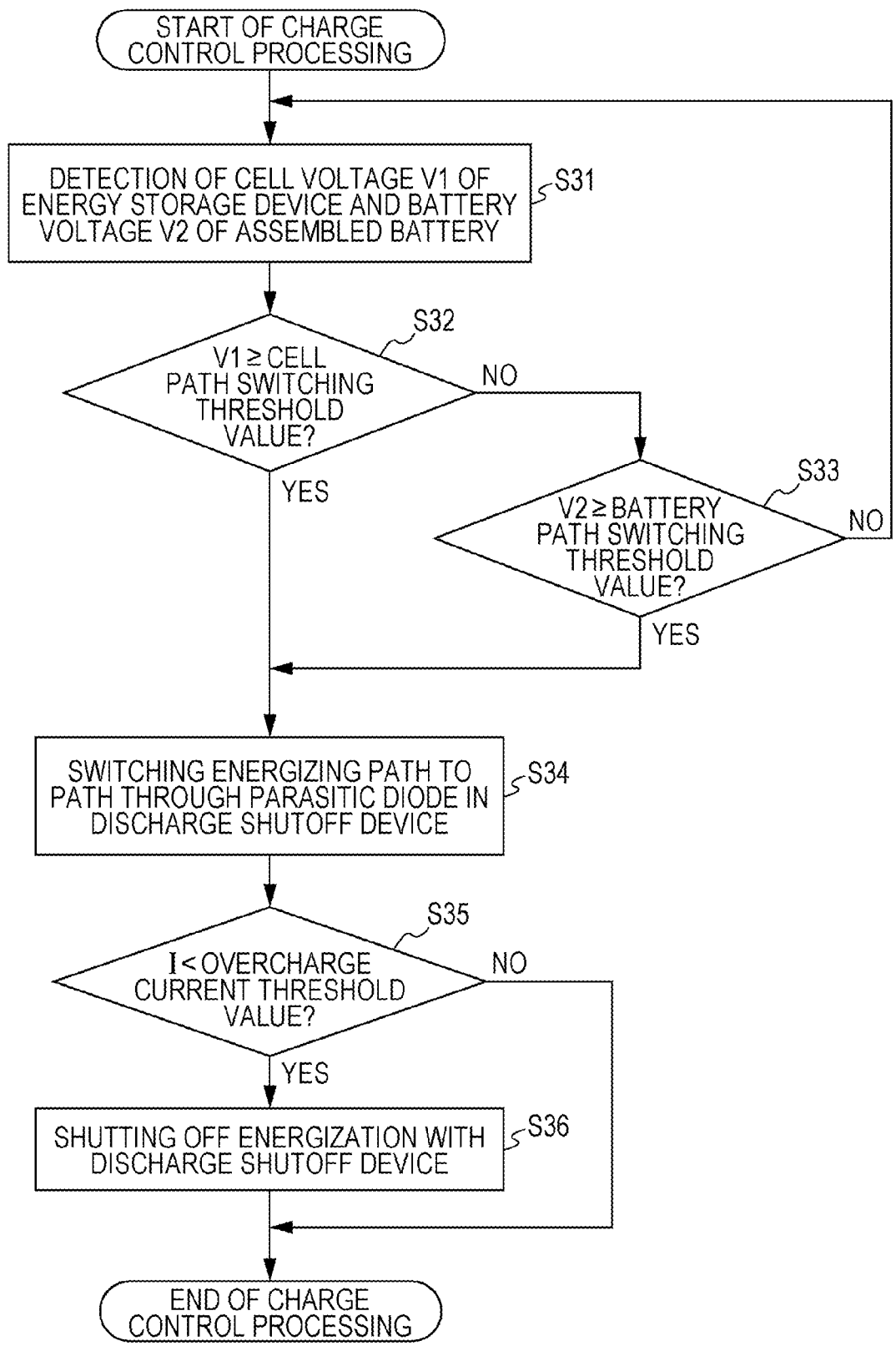
FIG. 8 is a flowchart diagram of charge control processing.

Thus, in the present embodiment, as shown in FIG. 8, the charge control processing by the CPU 33 is performed.

In the charge control processing, the external charger CH is connected to the pair of external terminal units 12. When the charge is started, as shown in FIG. 8, first, the CPU 33 causes the voltage detection circuit 31 to detect the cell voltage V1 of each energy storage device 21 and the battery voltage V2 of the assembled battery 20 (S31).

Next, the CPU 33 compares the cell voltage V1 with the cell path switching threshold value stored in the memory 34 (S32). Here, the cell path switching threshold value is a threshold value for switching the current path and for decreasing the charge voltage for the energy storage device 21, and is set to a value higher than the full charge voltage of the energy storage device 12 and lower than the cell overcharge detection threshold value at which the energy storage device 12 becomes the overcharge state.

Then, when the cell voltage V1 in any one of the energy storage devices 21 is equal to or more than the cell path switching threshold value (YES in S32), the CPU 33 transmits a shutoff switching instruction to the discharge shutoff device 43. Thus, the current between the drain and the source in the discharge shutoff device 43 is shut off, and as shown in FIG. 3, the energizing path is switched to the energizing path 12 through the parasitic diode 43D, whereby the charge voltage for the energy storage device 21 is lowered (S34).

In other words, if the cell voltage V1 in any one of the energy storage devices 21 is equal to or more than the cell path switching threshold value, the energy storage device 21 can be charged through the parasitic diode 43D and the charge voltage for the energy storage device 21 can be reduced, so that the charge current can be significantly reduced, and the time until the cell voltage V1 of the energy storage device 21 reaches the cell overcharge detection threshold value can be delayed. It should be noted that in the process of the cell voltage V1 of the energy storage device 21 reaching the cell path switching threshold value, the cell voltage V1 reaches equal to or more than the equalization start threshold value, and the equalization processing (S16) is performed in S16 of the overcharge protection processing.

On the other hand, if the cell voltage V1 in any one of the energy storage devices 21 is less than the cell path switching threshold value (NO in S32), the CPU 33 compares the battery voltage V2 of the assembled battery 20 with the battery path switching threshold value stored in the memory 34. Here, the battery path switching threshold value is a threshold value for switching the current path to lower the charge voltage for the energy storage device 21 similarly to the cell path switching threshold value; and is set to a value equal to or more than the full charge voltage value of the assembled battery 20 being the sum of the full charge voltages of the energy storage devices 12, and lower than the battery overcharge detection threshold value at which the total voltage of the plurality of energy storage devices 12 (battery voltage V2 of the assembled battery 20) becomes the overcharge state.

If the battery voltage V2 is less than the battery path switching threshold value (NO in S33), the CPU 33 returns to S31, and if the battery voltage V2 is equal to or more than the battery path switching threshold value (YES in S33), the CPU 33 transmits a shutoff switching instruction to the discharge shutoff device 43. Thus, the current between the drain and the source in the discharge shutoff device 43 is shut off, and the energizing path is switched to the energizing path 12 through the parasitic diode 43D, whereby the charge voltage for the energy storage device 21 is lowered (S34).

In other words, even if the cell voltage V1 in any one of the energy storage devices 21 is less than the cell path switching threshold value, if the battery voltage V2 of the assembled battery 20 is equal to or more than the battery path switching threshold value, charging the energy storage devices 21 and the assembled battery 20 through the parasitic diode 43D to lower the charge voltage for the assembled battery 20 allows the charge voltage to be reduced. Therefore, the charge can be continued while the assembled battery 20 is prevented from becoming the overcharge state.

Figure 9:
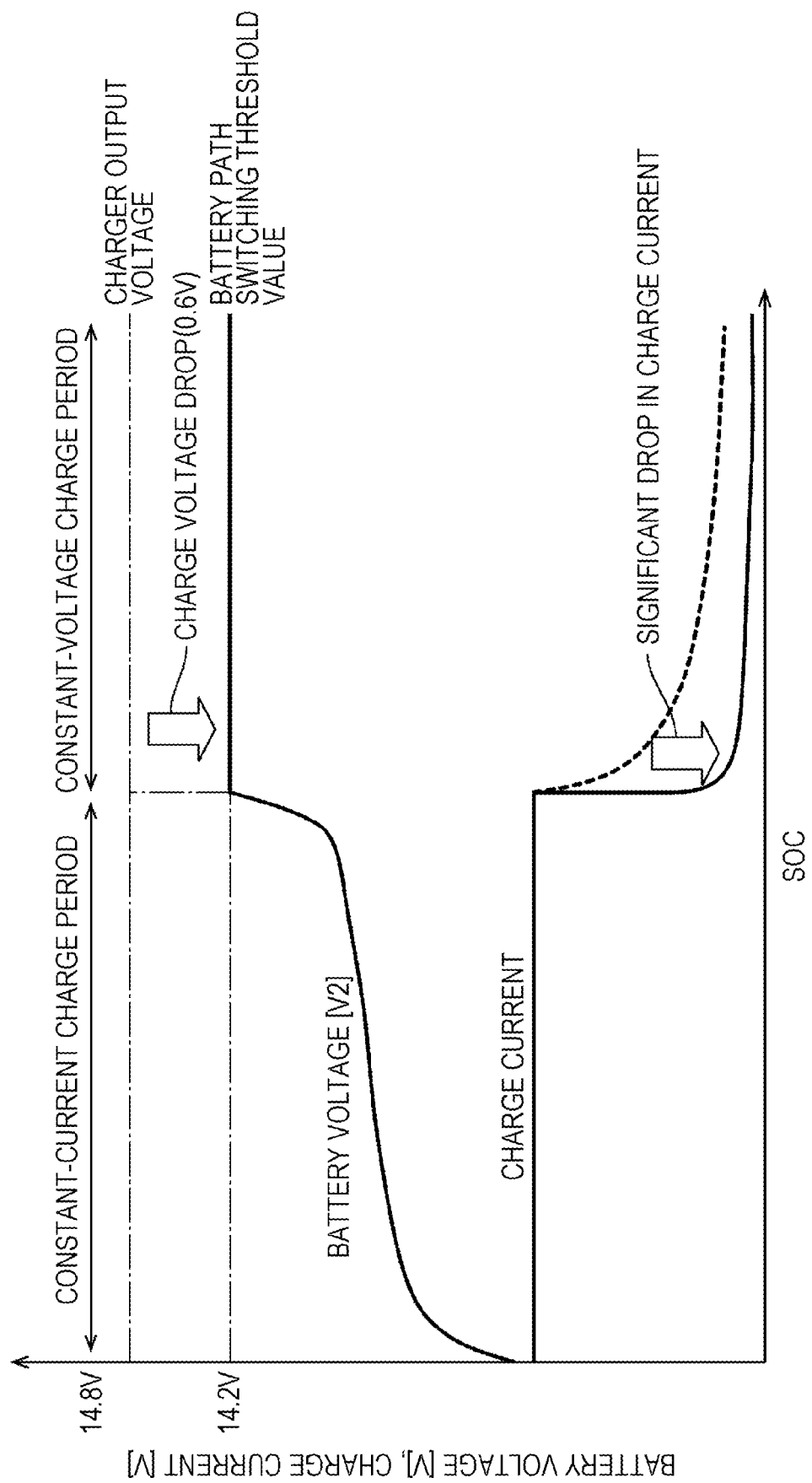
FIG. 9 is a graph showing changes in battery voltage and charge current for an assembled battery in a constant-current constant-voltage charge.

For example, FIG. 9 shows the change in the battery voltage V2 of the assembled battery 20 and the charge current in the constant-current constant-voltage charge. Here, in the case of the constant-current constant-voltage type external charger for lead-acid batteries having a switching voltage from the constant-current charge to the constant-voltage charge of 14.8 [V] (charger output voltage is 14.8 [V]), the battery voltage charge threshold value of the energy storage device 10 is set to 14.2 [V] obtained by subtracting the voltage drop amount (0.6 [V]) being the voltage drop by the parasitic diode 43D from the charge voltage.

In other words, the battery path switching threshold value is set to a value higher than the full charge voltage value 14 [V] of the assembled battery 20 being the sum of the full charge voltages 3.5 [V] of the energy storage devices 12 and lower than the battery overcharge detection threshold value 14.5 [V] at which the total voltage of the plurality of energy storage devices 12 (battery voltage V2 of the assembled battery 20) becomes the overcharge state, for example, 14.2 [V]. In addition, the cell path switching threshold value is set to a value higher than full charge voltage 3.5 [V] of energy storage device 12 and lower than the battery overcharge detection threshold value 4.0 [V] at which the energy storage device 12 becomes the overcharge state, for example, 3.6 [V].

Under these conditions, when the external charger CH for lead-acid batteries is connected to a pair of external terminal units 12, and the constant-current charge is started in the energizing path I1 shown in FIG. 3, the battery voltage V2 starts to rise as shown in FIG. 9. In addition, when the constant-current charge is started, the CPU 33 detects the cell voltage V1 of each energy storage device 21 and the battery voltage V2 of the assembled battery 20 by using the voltage detection circuit 31.

It should be noted that the decision on the charge start by the external charger CH is performed by the CPU 33, for example, through the voltage detection across the external terminal units 12 by the voltage detection circuit 31 and the detection of the charge current with the power across the current detection resistor 41.

Then, if the cell voltage V1 in any one of the energy storage devices 21 is equal to or more than the cell path switching threshold value (3.6 [V]), or if the cell voltage V1 in any one of the energy storage devices 21 is less than the cell path switching threshold value (3.6 [V]) and the battery voltage V2 of the assembled battery 20 is equal to or more than the battery path switching threshold value (14.2 [V]), the CPU 33 shuts off the current between the drain and the source of the discharge shutoff device 43 to switch to the charge through the energizing path 12 through the parasitic diode 43D as shown in FIG. 3. Then, as shown in FIG. 9, the charge voltage for the assembled battery 20 is lowered by about 0.6 [V] with the parasitic diode 43D, and the assembled battery 20 is charged with a charge voltage of about 14.2 V (3.55 [V] per energy storage device 21) adapted to the assembled battery 20. As shown in FIG. 9, the external charger CH considers that the battery voltage of the assembled battery 20 has reached 14.8 [V] to switch the constant-current charge to the constant-voltage charge.

In other words, if the cell voltage V1 in any one of the energy storage devices 21 is equal to or more than the cell path switching threshold value, charging the energy storage device 21 and the assembled battery 20 through the parasitic diode 43D and lowering the charge voltage for the energy storage device 21 and the assembled battery 20 allows the charge current to be significantly reduced. Therefore, the time until the cell voltage V1 of the energy storage device 21 reaches the cell overcharge detection threshold value can be delayed.

Thus, for example, even if the energy storage apparatus 10 is charged by the external charger CH with higher voltage than the assumed charge voltage, the time for the equalization processing for equalizing variation in charge amount among the energy storage devices 21 can be secured. Thereby, it is possible to prevent a case where the equalization processing is not done in time, and the cell voltage V1 of the energy storage device 21 exceeds the cell overcharge detection threshold value, which causes the energization from the external charger CH to the assembled battery 20 to be shut off in the charge shutoff device 42. Thus, the charge of the energy storage apparatus 10 can be continued.

In addition, even if the cell voltage V1 in any one of the energy storage devices 21 is less than the cell path switching threshold value, if the battery voltage V2 of the assembled battery 20 is equal to or more than the battery path switching threshold value, charging the energy storage devices 21 and the assembled battery 20 through the parasitic diode 43D to lower the charge voltage for the assembled battery 20 allows the charge voltage to be reduced. Therefore, the charge can be continued while the assembled battery 20 is prevented from becoming the overcharge state.

Next, after the charge of the external charger CH switches from the constant-current charge to the constant-voltage charge, the CPU 33 compares the charge current I with the overcharge current threshold value stored in the memory 34 (S35). Then, if the charge current I exceeds the overcharge current threshold value (NO in S35), the charge control processing is ended. It should be noted that the overcharge current threshold value is a value smaller than the stop current value at which the external charger CH decides that the energy storage apparatus 10 reaches the full charge.

On the other hand, if the charge current I drops to or below the overcharge current threshold value (YES in S35), the CPU 33 transmits a shutoff switching instruction for shutting off the current through the charge shutoff device 42. The instruction causes the charge shutoff device 42 to shut off the energization from the external charger CH to the assembled battery 20 in the charge shutoff device 42, thereby preventing the assembled battery 20 from reaching the overcharge state (S36).

In other words, if the charge continues despite the charge current I being lower than the stop current value set in the external charger CH, the CPU 33 assumes that a fault occurs in the external charger CH, completely shuts off the charge current to the energy storage device 21, and completes the charge to the energy storage apparatus 10.

Then, repeating this charge control processing at all times or periodically prevents the energy storage device 21 and the assembled battery 20 from becoming the overcharge state.

In the present embodiment, the case where the energy storage apparatus 10 is connected to the external charger CH for lead-acid batteries is described. However, the present invention is not limited to the above case. Even when the energy storage apparatus 10 is charged by a vehicle charger such as an alternator for lead-acid batteries mounted on a vehicle, the energy storage device 21 and the assembled battery 20 can be prevented from becoming the overcharge state by the charge control processing.

As described above, according to the present embodiment, when the energy storage apparatus 10 is charged by the external charger CH, even if the energy storage apparatus 10 is accidentally charged by a constant-current constant-voltage type external charger CH of 12 V or 24 V for lead-acid batteries, when the cell voltage V1 of any one of the energy storage devices 21 becomes equal to or more than the cell path switching threshold value, or when the battery voltage V2 of the assembled battery 20 becomes equal to or more than the battery path switching threshold value, the energization between the source and the drain of the discharge shutoff device 43 is shut off. Then, switching the charge path to the path through the parasitic diode 43D reduces the charge voltages for the energy storage device 21 and the assembled battery 20, and significantly reduces the charge current. Thus, even if there is variation in charge amount among energy storage devices 21, the time for equalization processing for equalizing the charge amount among the energy storage devices 21 can be secured and the cell voltage V1 of the energy storage device 21 can be prevented from exceeding the cell overcharge detection threshold value.

In other words, even if a constant-current constant-voltage type external charger CH for lead-acid batteries is used, the charge of the energy storage apparatus 10 can be continued while the assembled battery 20 is prevented from becoming the overcharge state. As a result, since the charge of the energy storage apparatus 10 can be normally ended without the power of the external charger CH being shut off, problems caused by the energy storage apparatus 10 performing an unexpected operation, such as suddenly shutting off the current, can be prevented from occurring in the external charger CH.

For example, as an alternative to the discharge shutoff device 43, a method of providing a contact relay (mechanical switch) in the current path L, providing a diode for lowering the voltage in parallel with the contact relay, and making the charge path through the diode is also conceivable.

However, when the contact relay and the diode are provided and the charge path is made through the diode, it is necessary to provide the contact relay and the diode individually, so that the number of components of the control board increases.

According to the present embodiment, since the charge voltage can be lowered by using the parasitic diode 43D built in the discharge shutoff device (FET) 43, the number of components of the control board 18 can be reduced and the control circuit can be simplified, for example, as compared with the case where the contact relay and the diode are individually provided in the control board.

In addition, according to the present embodiment, when the charge current I applied by the external charger CH drops to or below the overcharge current threshold value lower than the stop current value at which the energy storage apparatus 10 is decided to reach the full charge, the energization can be shut off in the charge shutoff device 42 (auxiliary current breaker), so that if the charge is continued due to a fault occurring in the external charger CH despite the charge being completed, the charge current to the energy storage device 21 can be completely shut off, and the charge to the energy storage apparatus 10 can be completed.

Other Embodiments

The technique disclosed herein is not limited to the embodiment described by the above description and drawings, and includes, for example, various aspects as follows.

(1) In the above embodiment, the charge shutoff device 42 is connected in the current path L. However, without being limited thereto, the charge shutoff device may not be connected in the current path L by the provision of, for example, an overcharge prevention mechanism on the charger side.

(2) In the above embodiment, the energization control means is constituted by the discharge shutoff device 43 including an FET incorporating the parasitic diode 43D. However, without being limited thereto, the energization control means may be constituted by a contact relay and a diode for dropping the voltage in parallel with the contact relay.

What is claimed is:

1. An energy storage apparatus, comprising:
an energy storage device;
a voltage dropper configured to drop a charge voltage for the energy storage device;
a current switcher connected in parallel with the voltage dropper;
a voltage detector configured to detect a voltage of the energy storage device; and
a controller,
wherein, when the voltage of the energy storage device exceeds a predetermined value after starting charging the energy storage device, the controller causes the current switcher to switch a path of a charge current to the energy storage device to a path through the voltage dropper,
wherein the voltage dropper is located on the path through the voltage dropper that extends from a positive electrode external terminal of the energy storage apparatus to a positive electrode of the energy storage device,
wherein the current switcher comprises a semiconductor switch incorporating the voltage dropper as a parasitic diode, the parasitic diode allowing the charge current to pass therethrough, and
wherein, with regard to diode, an entirety of the voltage dropper and an entirety of the current switcher include only the parasitic diode.

2. The energy storage apparatus according to claim 1, wherein the predetermined value is set to be higher than a full charge voltage of the energy storage device and lower than an overcharge voltage of the energy storage device, and
wherein, when the energy storage device is charged with a voltage higher than the full charge voltage of the energy storage device and the voltage of the energy storage device exceeds the predetermined value, the controller causes the current switcher to switch the path of the charge current to the path through the voltage dropper.

3. An energy storage apparatus capable of being charged with any one of a first charger and a second charger having a charge voltage higher than that of the first charger, the energy storage apparatus comprising:
an energy storage device;
a voltage dropper configured to drop a charge voltage for the energy storage device;
a current switcher connected in parallel with the voltage dropper;
a voltage detector configured to detect a voltage of the energy storage device; and
a controller,
wherein, when the energy storage device is charged by the second charger and the voltage of the energy storage device exceeds a predetermined value after starting charging the energy storage device, the controller causes the current switcher to switch a path of a charge current to the energy storage device to a path through the voltage dropper,
wherein the voltage dropper is located on the path through the voltage dropper that extends from a positive electrode external terminal of the energy storage apparatus to a positive electrode of the energy storage device,
wherein the current switcher comprises a semiconductor switch incorporating the voltage dropper as a parasitic diode, the parasitic diode allowing the charge current to pass therethrough, and
wherein, with regard to diode, an entirety of the voltage dropper and an entirety of the current switcher include only the parasitic diode.

4. The energy storage apparatus according to claim 3, wherein the predetermined value is determined by subtracting, from the charge voltage of the second charger, a voltage drop amount by which the voltage dropper drops a voltage.

5. The energy storage apparatus according to claim 1, wherein a plurality of the energy storage devices is connected in series,
wherein the voltage detector is capable of detecting each voltage of the energy storage devices, and
wherein the controller performs equalization processing for equalizing variation in a charge amount among the energy storage devices when switching the path of the charge current to the path through the voltage dropper.

6. The energy storage apparatus according to claim 1, further comprising:
a current detector configured to detect a current flowing through the energy storage device; and
an auxiliary current breaker configured to shut off the charge current to the energy storage device,
wherein the controller completely shuts off the charge current to the energy storage device with the auxiliary current breaker when the charge current to the energy storage device is lower than a current stop value set in a charger.

7. The energy storage apparatus according to claim 1, wherein the energy storage device includes an iron phosphate-based lithium ion battery, and wherein the energy storage device is charged by a charger for lead-acid batteries, and a charge voltage is dropped with the voltage dropper when the voltage of the energy storage device exceeds the predetermined value.

8. The energy storage apparatus according to claim 1, further comprising:

a lid disposed on an upper surface of energy storage apparatus, the positive electrode external terminal projecting from the lid.

9. The energy storage apparatus according to claim 8, wherein the path of the charge current extends from the positive electrode external terminal to the positive electrode of the energy storage device.

10. The energy storage apparatus according to claim 1, wherein the controller performs an equalization for equalizing variation in a charge amount among the energy storage devices when switching the path of the charge current to the path through the voltage dropper.

11. The energy storage apparatus according to claim 10, wherein the energy storage device is charged only by a single charger.

12. The energy storage apparatus according to claim 11, wherein the voltage dropper and the current switcher are located on the path that extends from the positive electrode external terminal of the energy storage apparatus to a positive electrode of the energy storage device.

13. The energy storage apparatus according to claim 1, wherein the controller performs an equalization during a constant-current charge and a constant-voltage charge for equalizing variation in a charge amount among the energy storage devices when switching the path of the charge current to the path through the voltage dropper.

14. The energy storage apparatus according to claim 1, wherein the controller performs an equalization for equalizing variation in a charge amount among the energy storage devices only after switching the path of the charge current to the path through the voltage dropper.

* * * * *